(12) United States Patent
Birk

(10) Patent No.: US 6,756,143 B2
(45) Date of Patent: Jun. 29, 2004

(54) FUEL CELL SYSTEM AND METHOD FOR STARTING A FUEL CELL SYSTEM

(75) Inventor: Wolfram Birk, Wendingen (DE)

(73) Assignee: Ballard Power Systems AG, Kirchheim/Teck-Nabern (DE)

(*) Notice: Subject to any disclaimer, the term of this patent is extended or adjusted under 35 U.S.C. 154(b) by 342 days.

(21) Appl. No.: 09/986,461

(22) Filed: Nov. 8, 2001

(65) Prior Publication Data
US 2002/0058171 A1 May 16, 2002

(30) Foreign Application Priority Data
Nov. 8, 2000 (DE) .......................................... 100 55 245

(51) Int. Cl.$^7$ ........................... H01M 8/04; H01M 8/06; H01M 8/00
(52) U.S. Cl. ............................. 429/26; 429/34; 429/13
(58) Field of Search .............................. 429/13, 17, 20, 429/26, 34, 38, 39

(56) References Cited

U.S. PATENT DOCUMENTS 4,344,849 A * 8/1982 Grasso et al. ............... 210/662
5,271,916 A    12/1993 Vanderborgh et al. ...... 423/246
6,572,994 B1 * 6/2003 Shimotori et al. ............ 429/26
2003/0044663 A1 * 3/2003 Ballatine et al. .............. 429/26

FOREIGN PATENT DOCUMENTS

| DE | 43 34 983 | 10/1993 |
| DE | 195 44 895 | 12/1995 |
| DE | 19922923 | 11/2000 |
| JP | 02-197057 | 8/1990 |
| JP | 4 296 460 | 3/1991 |
| JP | 81 33 701 | of 1994 |
| JP | 100 29 802 | 7/1996 |
| WO | 00/54355 | 9/2000 |

* cited by examiner

Primary Examiner—Patrick Ryan
Assistant Examiner—Tracy Dove
(74) Attorney, Agent, or Firm—Seed IP Law Group PLLC

(57) ABSTRACT

A fuel cell system, particularly for a motor vehicle, includes (1) at least one fuel cell and (2) a device for supplying at least one fuel cell with hydrogen or a hydrogen-containing gas. Particularly during start-up or a cold start of the system, individual components of the device or at least one fuel cell can be supplied thermal energy with cooling water contained in a cooling water system. The cooling water system is equipped with an insulating device for storing cooling water in a thermally insulated manner.

10 Claims, 2 Drawing Sheets

FUEL CELL SYSTEM AND METHOD FOR STARTING A FUEL CELL SYSTEM

This application claims the priority of German patent document 100 55 245.5, filed Nov. 8, 2000, the disclosure of which is expressly incorporated by reference herein.

BACKGROUND AND SUMMARY OF INVENTION

The present invention relates to a fuel cell system as well as a method for starting a fuel cell system.

Fuel cell systems, for example, include a gas generating device that supplies hydrogen required as fuel for the operation of the fuel cell. In a reformer, for example, methanol is reformed, wherein carbon dioxide and hydrogen are generated pursuant to the following reaction:

$$CH_3OH + H_2O \rightarrow CO_2 + 3H_2$$

By adding air/oxygen, this process can be supported through the exothermic transformation of hydrocarbon. A hydrogen-rich gas is generated through partial oxidation of the hydrocarbon.

During this reformation of methanol, carbon monoxide is also created in intermediate steps so that the reformate largely contains hydrogen, carbon dioxide, water (steam), and carbon monoxide. The approx. 1% CO concentration must be lowered to less than 40 ppm for usage of the reformate in a fuel cell because carbon monoxide drastically decreases the efficiency of polymer membrane fuel cells.

In order to remove CO in a hydrogen-rich atmosphere, a hydrogen shift reaction and selective oxidation of CO in fixed-bed reactors can be performed on appropriate selective catalysts. Such measures make it possible to reduce the CO content of the reformate to below 40 ppm.

Such methods are known, for example, from U.S. Pat. No. 5,271,916; DE 43 349 83 A1; or DE 195 44 895 C1 (U.S. Pat. No. 5,874,051).

The numerous conventional devices and methods relate to the operation of the systems once they have reached their operating temperature. When starting a fuel cell system, it is necessary to bring the CO oxidation stages as quickly as possible to the operating temperature in order to make a reformate with low CO concentrations available to the fuel cell right from the beginning.

In order to solve this problem, JP 0010029802A discloses pretreating the catalyst of the selective oxidation stage with a gas that basically consists of hydrogen at a temperature above 50° C., wherein the gas in the catalyst reacts without the addition of air. JP 0008133701 A discloses feeding excessive oxidizing agents (air) to the selective oxidation reactor for a cold start or after interruptions whenever the temperature is below the catalyst operating temperature. This additionally oxidizes hydrogen apart from carbon monoxide, causing the temperature to increase rapidly due to the exothermic reaction. When reaching the activation temperature of the catalyst, the supply of the oxidizing agent is controlled so as to ensure optimal transformation of the carbon monoxide.

JP 04296460 A discloses the usage during the operation of a fuel cell of cooling water that was warmed up during a previous operation in order to increase the reformate gas temperature.

An object of the present invention consists of ensuring the availability of a motor vehicle driven with a fuel cell system during cold starting situations and after interruptions.

This object is resolved with a fuel cell system and a method for starting a fuel cell system according to preferred embodiments of the present invention.

Pursuant to the present invention, the cooling water stream of the fuel cell can be used to warm up the components of a fuel cell system (gas generating system, fuel cell). The cooling water of the cooling water system has a temperature of about 80° C. downstream from the fuel cells. By storing this water in an insulating device and/or a heat-insulated container, it is possible to maintain this water temperature over longer periods of time even when the vehicle stands still. By supplying the components of the fuel cell system of the vehicle with the warm cooling water, a controlled warming of the components is possible, which in turn allows the operational readiness of the fuel cell system and/or the vehicle to be accomplished very quickly.

Pursuant to a preferred embodiment of the fuel cell system according to the present invention, a latent heat storage unit is designed within the insulating device. A latent heat storage unit may comprise, for example, of a closed body in which a suitable latent heat storage medium is located. The latent storage unit releases its stored thermal energy to the water via the body, wherein the latent storage medium, for example, solidifies. The medium melts when heating the water as soon as the water temperature has reached the melting temperature of the latent storage medium. This measure makes it possible to maintain a cooling water temperature that promotes the start of the fuel cell system over very long periods of time.

Pursuant to a particularly preferred embodiment of the fuel cell system according to the present invention, for which protection is sought separately, means for the selective supplying of heat to defined areas of the fuel cell system are provided. Specifically when cold starting a gas generating system for fuel cells, the catalytic components (e.g., reformer, CO oxidator, etc.) must be brought as quickly as possible to an operating temperature, for example, a temperature that is higher than 20° C., so that the respective reactions occur more quickly. Particularly in exothermic stages such as CO oxidators, it has proven useful to pre-warm a small area of the catalytically active zone. When these areas are started catalytically, a reaction creates thermal energy so that the complete catalytic stage can start accordingly quickly.

It is useful if the means for the selective supplying of heat are designed as ducts that run through the defined areas. It is possible to run fine cooling water ducts through the components that need to be warmed up, comparable, for example, to the cooling water ducts of an internal combustion engine. This measure allows the components to be warmed in a controlled manner in those areas where a catalytic reaction is supposed to start.

Pursuant to another embodiment of the fuel cell system according to the present invention, a burner or a instantaneous water heater is provided for the selective heating of the cooling water. With this measure, a desired cooling water temperature can also be maintained over extended periods of time.

It is useful if the device for supplying the fuel cell with hydrogen-containing gas is designed as a gas generating unit. The catalytic components of such a gas generating system, such as reformer or CO oxidator, can be warmed up very quickly to a desired operating temperature with the measures suggested in the present invention.

It is useful if at least one catalytic element of the gas generating unit is arranged within a tubular housing. This way fine ducts can run through a portion of or the entire tube wall, with the warm cooling water being able to flow through these ducts. The production of such a tube can be realized, for example, as an extruded profile.

BRIEF DESCRIPTION OF THE DRAWINGS

Other objects, advantages and novel features of the present invention will become apparent from the following detailed description of the present invention when considered in conjunction with the accompanying drawings.

DETAILED DESCRIPTION OF THE DRAWINGS

Figure 1:
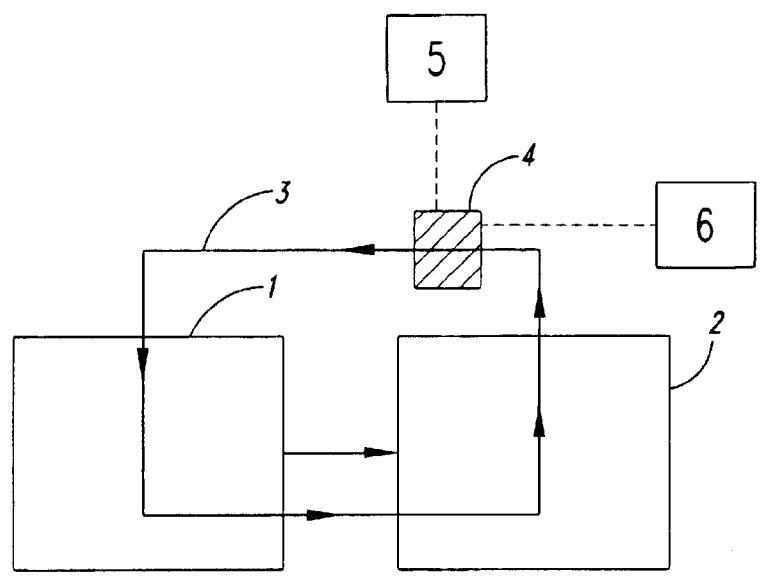
FIG. 1 is a simplified block diagram to show relevant components of a fuel cell system according to the present invention.

FIG. 1 shows the most important components of a fuel cell system. The number 1 designates a device for supplying fuel cells 2 with hydrogen or a hydrogen-containing gas. The device 1 can be, for example, a storage device for storing pure hydrogen. In the following, however, the device 1 is a gas generating device, which makes a hydrogen-containing gas available based on a reformation process of, for example, methanol.

The gas generating unit 1 contains a number of catalytic components (not shown in FIG. 1) for executing the desired reformation process. Examples are a reformer or a CO oxidator.

The fuel cells are generally equipped with a circuit cooling system, through which the fuel cells are fed with cooling agents and/or cooling water. The cooling water may be water with a glycol addition, which can be used even in ambient temperatures of below 0°C.

FIG. 1 shows that the circuit cooling system 3 also extends through the gas generating system 1. The circuit cooling system 3 contains an insulated container or insulating container 4, in which relatively warm cooling water that exits the fuel cells 2 can be stored in a thermally insulated manner. When operating the fuel cell system, the cooling water has a temperature of about 80° C. when exiting a fuel cell. The cooling water that has been warmed this way and is stored in the insulating container 4 serves the purpose of supplying selective components of the gas generating system 1 or also selective areas of the fuel cells 2 in the case of a cold starting mode.

The circuit cooling system 3 may be more complex than shown in FIG. 1. It may, for example, include a feature so that the supplying of the gas generating system 1 with cooling water is foregone during normal operation of the fuel cell system, wherein, for example, appropriate locking or redirecting devices for the circuit cooling system 3 can be incorporated.

The insulating container 4 can be connected with a burner 5 or a instantaneous water heater or also with a latent heat storage unit 6 for maintaining a desired cooling water temperature.

It is useful if, for example, after cold starting the fuel cell system, water still warm from the previous operation of the system and stored in the insulating container 4 is forwarded to selected areas of the gas generating unit 1 or the fuel cells 2 through the circuit cooling system 3. Thus, catalytic components of the gas generating unit 1, for example, can be warmed up in a controlled manner in areas where a catalytic reaction is supposed to start.

Figure 2:
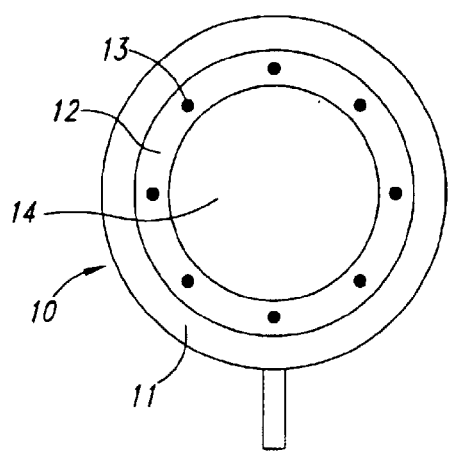
FIG. 2 is a cross-sectional view of a first preferred embodiment of a catalytic component of a fuel cell system according to the present invention.

FIG. 2 depicts a reformer 10 as a catalytic component. This reformer 10 contains in its interior a suitable catalytic material (e.g., a catalytic bed 14) that is surrounded by a tubular shell 12. The shell in turn is arranged in a tubular housing 11.

Fine ducts 13 run through the shell 12, with these ducts forming a part of the circuit cooling system 3 shown in FIG. 1. Accordingly, warmed up cooling water can flow through the ducts 13 for the selective warming of the catalytic bed.

Figure 3:
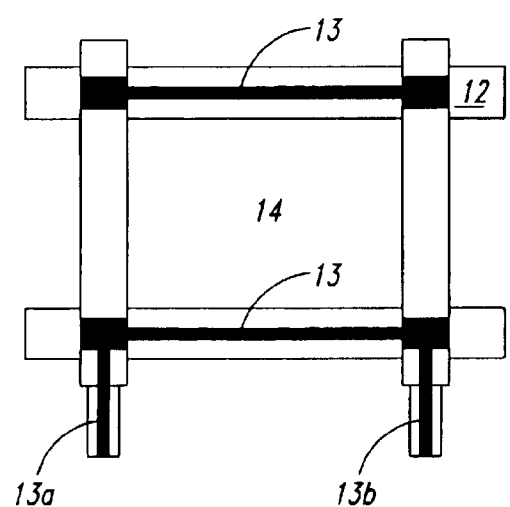
FIG. 3 is a view of the embodiment of FIG. 2 that is turned by 90°.

FIG. 3 also shows the ducts 13 that run through the tubular shell 12. Furthermore it shows inflow and outflow ducts 13a, 13b for the lower duct 13, which are in turn parts of the circuit cooling system 3.

Pursuant to the present invention, small areas of catalytic components can be warmed in a very controlled manner in order to ensure a quick start of a catalytic reaction. The system of supplying heat to the catalytic components through cooling water is independent from other gas streams of the fuel cell system. Due to the high thermal capacity of water compared to gases, the energy can be stored in a very limited space and is relatively easily insulated in the insulating container 4. The cooling water can be pumped easily through the system (with a pump, not shown) and offers a higher heat transfer coefficient compared to the flowing gases. It is therefore possible to utilize waste heat from the fuel cells stored in the cooling water, wherein this waste heat is already available upon short operating times of the vehicle.

Figure 4:
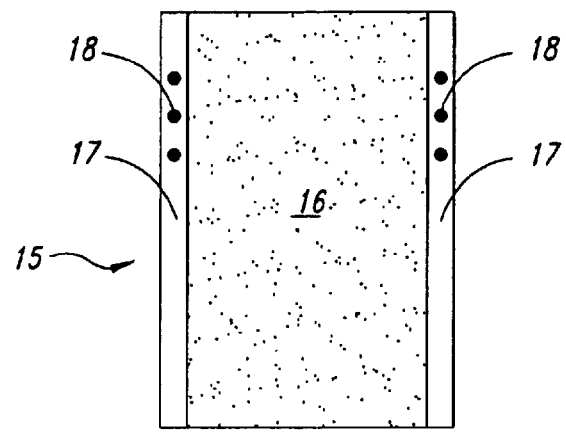
FIG. 4 is a cross-sectional view of a second preferred embodiment of a catalytic component of a fuel cell system according to the present invention.

FIG. 4 shows a catalytic component, which is part of the gas generating system 1, in the form of a plate heat exchanger 15. FIG. 4 only shows the end plates 17 of the plate heat exchanger 15 and not possibly incorporated intermediate plates. The catalytically active area between the end plates 17 has been marked 16. Cooling water ducts 18, which are similar to the embodiments in FIGS. 2 and 3, can bring the catalytically active area relatively quickly to a desired temperature when cooling water flows through and runs through the end plates 17. The cooling ducts 18 also represent a part of the cooling water circuit 3 shown in FIG. 1.

Figure 5:
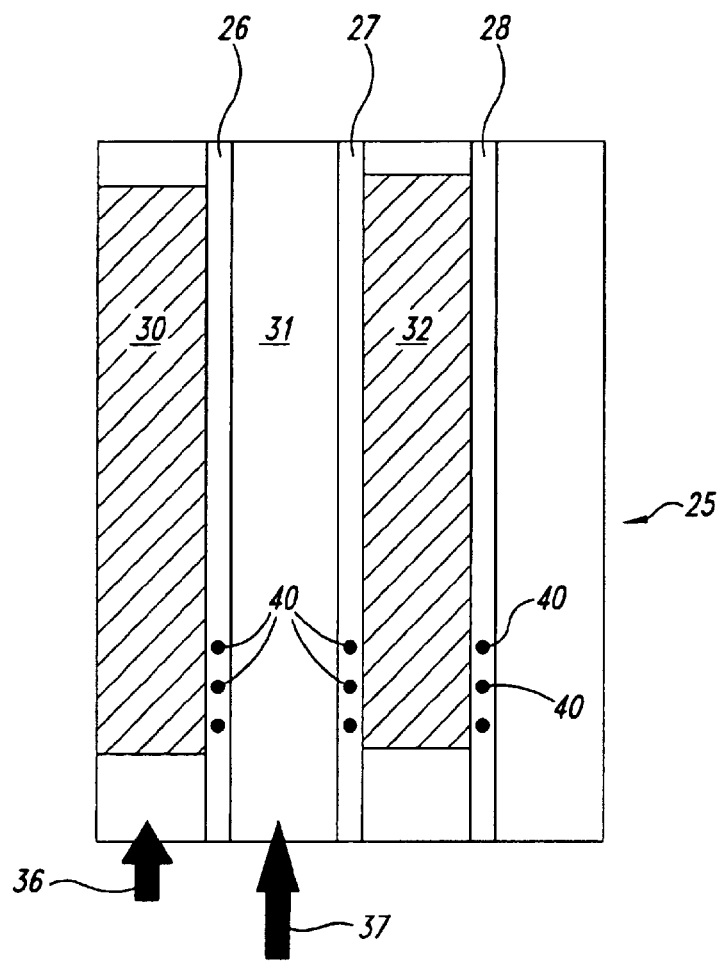
FIG. 5 is a third preferred embodiment of a catalytic components of a fuel cell system according to the present invention.

FIG. 5 shows a plate package of a heat exchanger 25. In FIG. 5 the depiction of the end plates is foregone. Therefore, only intermediate plates and/or separating walls between the functional areas of the plate heat exchanger are shown. The separating walls are marked 26, 27 and 28. In the example, the assumption was made that in the picture shown in FIG. 5 a catalytically active area 30 is located to the left of the separating wall 26, with a first medium stream 36 flowing through this area 30. The number 32 marks another catalytically active area between the separating walls 27 and 28, through which the first medium current 36 can also flow. Between the catalytic areas 30, 32 an area 31 is provided, through which a second medium stream (arrow 37) flows. In the separating walls 26, 27, 28 cooling water ducts 40 are incorporated, which contribute in the above-described manner to the accelerated warming of e.g. the catalytically active areas 30 and/or 32.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A fuel cell system, comprising:
    at least one fuel cell;
    a cooling water system equipped with an insulating device for storing cooling water from the at least one fuel cell in a thermally-insulated manner; and
    a device for supplying the at least one fuel cell with hydrogen or a hydrogen-containing gas,
    wherein, during start-up or a cold start of the fuel cell system, the device or the at least one fuel cell is supplied with thermal energy from cooling water stored in the insulating device.

2. A fuel cell system according to claim 1, wherein the device is a gas generation unit.

3. A fuel cell system according to claim 1, wherein the insulating device comprises a latent storage unit.

4. A fuel cell system according to claim 1, further comprising means for selectively feeding cooling water to defined areas of the device or defined areas of the at least one fuel cell.

5. A fuel cell according to claim 4, wherein said defined areas are areas of catalytic components.

6. A fuel cell system according to claim 4, wherein the means for the selectively feeding cooling water are ducts that run through the defined areas.

7. A fuel cell system according to claim 1, further comprising at least one of a burner or instantaneous water heater for selectively warming the cooling water.

8. A fuel cell system according to claim 2, wherein at least one catalytic component of the gas generation unit is arranged within a tubular housing.

9. A method for the start-up of a fuel cell system, comprising:
    storing cooling water from at least one fuel cell of the fuel cell system in a thermally insulating device of a cooling water system of the fuel cell system; and
    supplying thermal energy from the stored cooling water to the at least one fuel cell or to a device for supplying hydrogen or a hydrogen-containing gas to the at least one fuel cell.

10. A method according to claim 9, wherein the supplying of thermal energy is during a cold start of the fuel cell system.

* * * * *